United States Patent
McConnell

(10) Patent No.: US 9,953,045 B2
(45) Date of Patent: Apr. 24, 2018

(54) FAST STREAMS AND SUBSTREAMS

(71) Applicant: MICROSOFT TECHNOLOGY LICENSING, LLC, Redmond, WA (US)

(72) Inventor: Christopher C. McConnell, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/046,776

(22) Filed: Feb. 18, 2016

(65) Prior Publication Data

US 2016/0162526 A1  Jun. 9, 2016

Related U.S. Application Data

(62) Division of application No. 13/328,389, filed on Dec. 16, 2011, now Pat. No. 9,299,082.

(51) Int. Cl.
G06F 17/30 (2006.01)
G06Q 30/02 (2012.01)
G06Q 50/00 (2012.01)

(52) U.S. Cl.
CPC .... *G06F 17/30324* (2013.01); *G06F 17/3048* (2013.01); *G06F 17/30339* (2013.01); *G06F 17/30516* (2013.01); *G06Q 30/0201* (2013.01); *G06Q 50/01* (2013.01)

(58) Field of Classification Search
CPC ......... G06F 17/30324; G06F 17/30516; G06F 17/30339; G06F 17/3048; G06Q 30/0201; G06Q 50/01
See application file for complete search history.

(56) References Cited

U.S. PATENT DOCUMENTS

| | | |
|---|---|---|
| 7,711,006 B2 | 5/2010 | Dries et al. |
| 7,865,538 B2 | 1/2011 | Prager et al. |
| 2003/0208500 A1 | 11/2003 | Daynes et al. |
| 2004/0093263 A1* | 5/2004 | Doraisamy .... G06Q 10/063112 705/7.14 |
| 2007/0239881 A1 | 10/2007 | Schneider et al. |
| 2007/0260614 A1 | 11/2007 | Bray |
| 2010/0257315 A1 | 10/2010 | Zhu et al. |
| 2010/0318619 A1 | 12/2010 | Meijer |
| 2011/0029571 A1 | 2/2011 | Aggarwal et al. |
| 2012/0131139 A1* | 5/2012 | Siripurapu .............. H04L 65/60 709/217 |
| 2012/0143817 A1* | 6/2012 | Prabaker ........... G06F 17/30165 707/608 |

OTHER PUBLICATIONS

Stackeroverflow.com, What is a memory fence?, 2008, pp. 1-3.
(Continued)

*Primary Examiner* — Jorge A Casanova
(74) *Attorney, Agent, or Firm* — Schwegman Lundberg & Woessner, P.A.

(57) ABSTRACT

Various embodiments provide data structures and algorithms for efficiently computing a time ordered stream that is the combination of a time ordered substream for individual persons of interest. In addition, various embodiments provide an approach for identifying how many changes of interest have happened to a particular stream since it was last viewed.

17 Claims, 9 Drawing Sheets

(56) References Cited

OTHER PUBLICATIONS

"Alternatives to Locking," Retrieved at <<http://www.makelinux.net/ldd3/chp-5-sect-7>>, retrieved date: Oct. 20, 2011, pp. 5.
Zeitler et al., "Massive Scale-out of Expensive Continuous Queries," retrieved at <<http://www.vldb.org/pvldb/vol4/p1181-zeitler.pdf>>, Proceedings of the 36th International Conference on Very Large Databases, Sep. 3, 2011, vol. 4, No. 11, pp. 1181-1188.
Response to Election/Restriction mailed Nov. 26, 2013 in U.S. Appl. No. 13/328,389.
Requirement for Restriction/Election mailed Oct. 29, 2013 in U.S. Appl. No. 13/328,389.
Notice of Allowance and Fees Due dated Dec. 11, 2015 in U.S. Appl. No. 13/328,389.
Non-Final Rejection dated Jul. 22, 2015 in U.S. Appl. No. 13/328,389.
Non-Final Rejection dated Jan. 28, 2014 in U.S. Appl. No. 13/328,389.
Final Rejection dated Jun. 17, 2014 in U.S. Appl. No. 13/328,389.
Amendment dated Dec. 4, 2015 in U.S. Appl. No. 13/328,389.
Amendment dated Oct. 22, 2015 in U.S. Appl. No. 13/328,389.
Amendment dated Oct. 17, 2014 in U.S. Appl. No. 13/328,389.
Amendment dated Apr. 28, 2014 in U.S. Appl. No. 13/328,389.
Amendment dated Nov. 26, 2013 in U.S. Appl. No. 13/328,389.

\* cited by examiner

FAST STREAMS AND SUBSTREAMS

CLAIM OF PRIORITY

This application is a divisional of and claims priority to U.S. application Ser. No. 13/328,389 filed Dec. 16, 2011, entitled "FAST STREAMS AND SUBSTREAMS", the entirety of which is incorporated herein by reference.

BACKGROUND

One of the challenges in implementing a distributed system which supports a social network is how to efficiently compute a time ordered stream that is the combination of a time ordered substream for each person of interest. A related challenge is how to identify how many changes of interest have happened to a particular stream since it was last viewed.

For example, a user may have a set of friends that they follow and each of those friends may, over time, upload posts, comments, pictures and the like. A challenge exists because individuals whom a user follows may have their respective information or streams distributed across a number of servers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments provide data structures and algorithms for efficiently computing a time ordered stream that is the combination of a time ordered substream for individual persons of interest. In addition, various embodiments provide an approach for identifying how many changes of interest have happened to a particular stream since it was last viewed.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Various embodiments provide data structures and algorithms for efficiently computing a time ordered stream that is the combination of a time ordered substream for individual persons of interest. In addition, various embodiments provide an approach for identifying how many changes of interest have happened to a particular stream since it was last viewed.

In one or more embodiments, querying techniques are utilized to efficiently query over multiple, time-ordered streams in a distributed search system, such as one that supports social networks. In such networks, a primary stream typically shows posts from multiple people, e.g., all of an individual's friends, ordered in time. Querying over these streams can be challenging because each user's stream is typically stored together, but different users' information are distributed across a number of servers in order to scale. The inventive approach provides algorithms for effectively using memory to greatly speed up various operations such as, by way of example and not limitation: generation of a single globally sorted stream, generation of an ordered stream where the stream contains posts from a selection of streams, intersection of queries with a single globally ordered stream and/or an ordered stream containing posts from a selection of streams, and tracking notifications on stream activity.

In the discussion that follows, in-memory data structures are described for representing streams and substreams. The structures can be incrementally initialized while allowing multiple readers without locking. In addition, various algorithms are presented in which streams can be updated while allowing multiple readers without locking, global streams can be generated, merged substreams can be generated, queries can be intersected, and changes can be tracked since a last query.

In the following discussion, an example environment is first described that is operable to employ the techniques described herein. Example illustrations of the various embodiments are then described, which may be employed in the example environment, as well as in other environments. Accordingly, the example environment is not limited to performing the described embodiments and the described embodiments are not limited to implementation in the example environment.

Example Operating Environment

Figure 1:
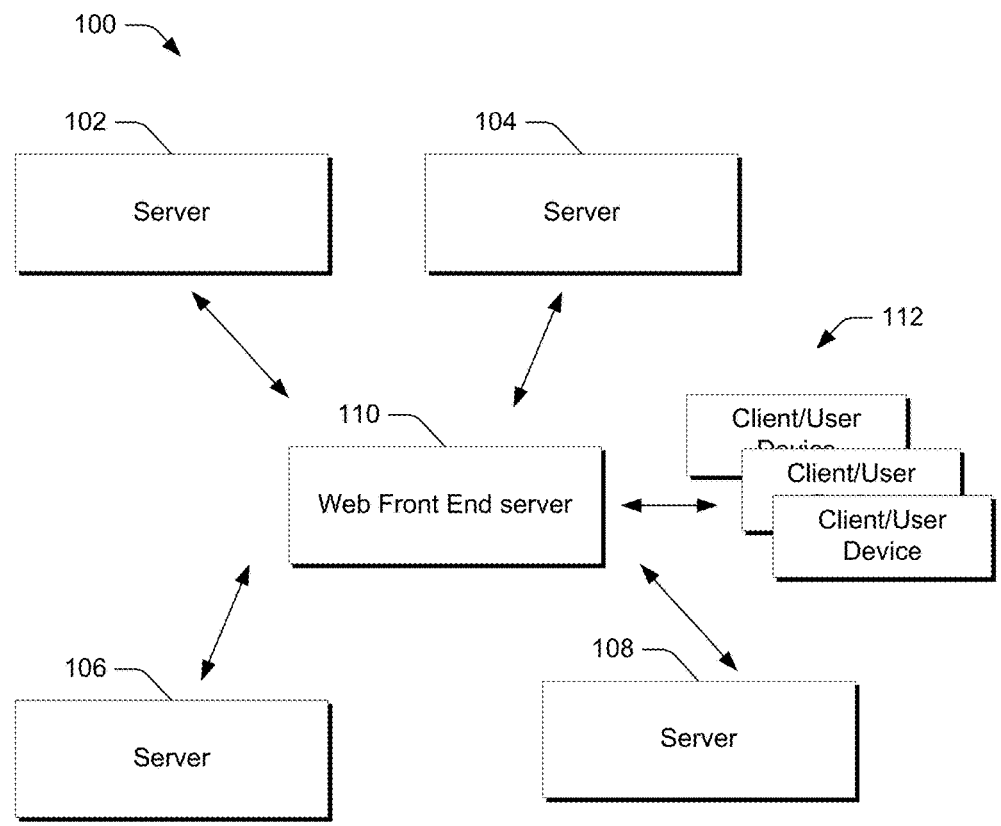
FIG. 1 is an illustration of an environment in an example implementation in accordance with one or more embodiments.

FIG. 1 illustrates an example operating environment in accordance with one or more embodiments, generally at 100. In this particular example, operating environment 100 includes a number of different servers 102, 104, 106, and 108. Each of the servers maintains user information, such as data that would be found in a user's stream in connection with a social networking environment. A user's stream typically contains postings, comments, images, and other information that a user can upload. In addition, a web front end server 110 communicates with servers 102, 104, 106, and 108 and provides an interface through which the various client/user devices 112 can access a time-ordered stream that is a combination of time ordered substreams for each person of interest.

In operation, the algorithms described below can be executed by the various servers 102, 104, 106, and 108 to organize and maintain streams associated with respective users that an individual may follow. Collectively, all of the users that a particular individual may follow may have their data or information distributed across the servers. The streams that are processed by each of the respective servers 102, 104, 106, and 108 are then combined by the web front end server 110 (which may or may not reside in one of the illustrated servers or a different server) so that a user can access, by way of a respective client/user device 112, and interact with an integrated stream that contains postings from users or friends that they follow.

Figure 2:
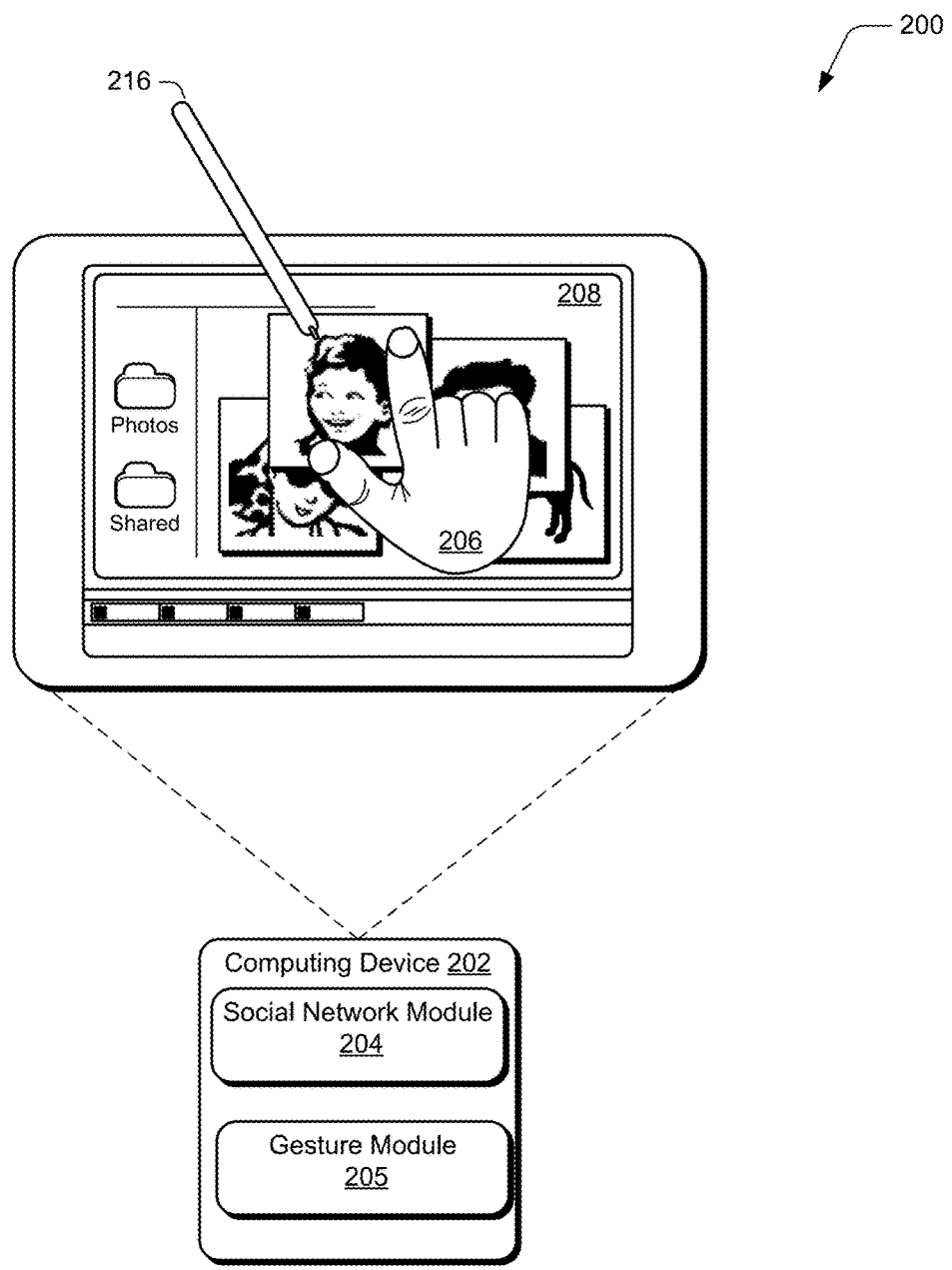
FIG. 2 illustrates an example computing device in accordance with one or more embodiments.

FIG. 2 is an illustration of a client side environment 200 in an example implementation that is operable to consume content that is produced by the techniques described in this document. The illustrated environment 200 includes an example of a computing device 202, such as a client/user device 112 (FIG. 1), that may be configured in a variety of ways. For example, the computing device 202 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth as further described in relation to FIG. 3. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 202 also includes software that causes the computing device 202 to perform one or more operations as described below.

Computing device 202 includes a social networking module 204 that is configured to enable a user to access and consume social network content associated with various streams and substreams for users that the user follows and vice versa.

Computing device 202 also includes, in some embodiments, a gesture module 205 that recognizes gestures that can be performed by one or more fingers, and causes operations to be performed that correspond to the gestures. The gestures may be recognized by module 205 in a variety of different ways. For example, the gesture module 205 may be configured to recognize a touch input, such as a finger of a user's hand 206 as proximal to display device 208 of the computing device 202 using touchscreen functionality. Module 205 can be utilized to recognize single-finger gestures and bezel gestures, multiple-finger/same-hand gestures and bezel gestures, and/or multiple-finger/different-hand gestures and bezel gestures.

The computing device 202 may also be configured to detect and differentiate between a touch input (e.g., provided by one or more fingers of the user's hand 106) and a stylus input (e.g., provided by a stylus 216). The differentiation may be performed in a variety of ways, such as by detecting an amount of the display device 208 that is contacted by the finger of the user's hand 206 versus an amount of the display device 208 that is contacted by the stylus 216.

Thus, the gesture module 205 may support a variety of different gesture techniques through recognition and leverage of a division between stylus and touch inputs, as well as different types of touch inputs.

Figure 3:
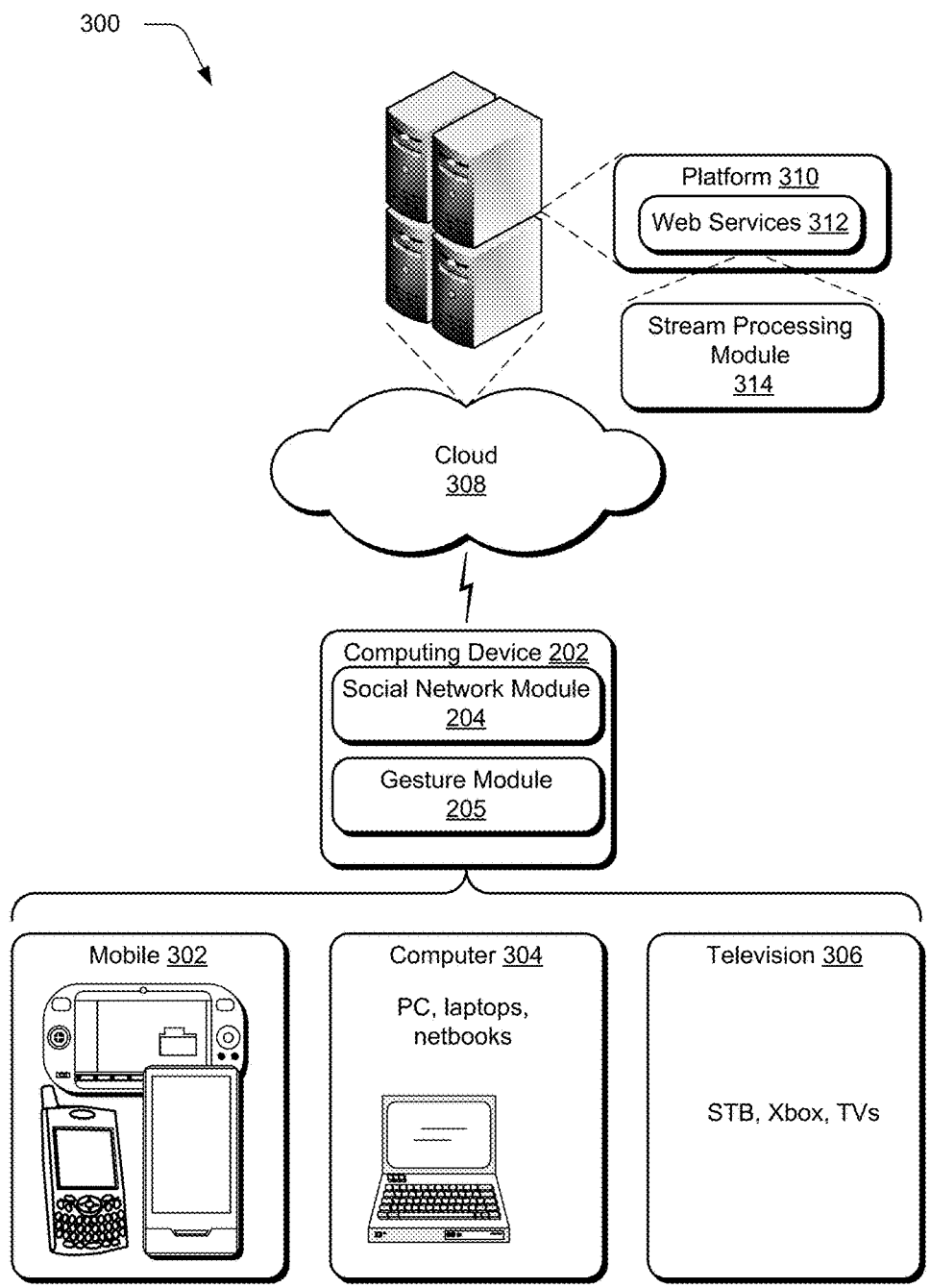
FIG. 3 is an illustration of a system in an example implementation showing FIG. 1 in greater detail.

FIG. 3 illustrates an example system 300 showing the social network module 204 and gesture module 205 as being implemented in an environment where multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network or the Internet or other means. The server or server farms can perform the functionality described below.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described the computing device 202 may be configured in a variety of different ways, such as for mobile 302, computer 304, and television 306 uses. Each of these configurations has a generally corresponding screen size and thus the computing device 202 may be configured as one of these device classes in this example system 300.

For instance, the computing device 202 may assume the mobile 302 class of device which includes mobile telephones, music players, game devices, and so on. The computing device 202 may also assume a computer 304 class of device that includes personal computers, laptop computers, netbooks, and so on. The television 306 configuration includes configurations of device that involve display in a casual environment, e.g., televisions, set-top boxes, game consoles, and so on. Thus, the techniques described herein may be supported by these various configurations of the computing device 202 and are not limited to the specific examples described in the following sections.

Cloud 308 is illustrated as including a platform 310 for web services 312. The platform 310 abstracts underlying functionality of hardware (e.g., servers) and software resources of the cloud 308 and thus may act as a "cloud operating system." For example, the platform 310 may abstract resources to connect the computing device 202 with other computing devices. The platform 310 may also serve to abstract scaling of resources to provide a corresponding level of scale to encountered demand for the web services 312 that are implemented via the platform 310. A variety of other examples are also contemplated, such as load balancing of servers in a server farm, protection against malicious parties (e.g., spam, viruses, and other malware), and so on. Platform 310 includes a stream processing module 314 that can be distributed across servers or reside on a single server. The stream processing module 314 is operative to employ the various algorithms described below.

Thus, the cloud 308 is included as a part of the strategy that pertains to software and hardware resources that are made available to the computing device 202 via the Internet or other networks. For example, the stream-based processing described below may be implemented in part on the computing device 202 as well as via a platform 310 that supports web services 312 across distributed servers.

The gesture techniques supported by the gesture module may be detected using touchscreen functionality in the mobile configuration 302, track pad functionality of the computer 304 configuration, detected by a camera as part of support of a natural user interface (NUI) that does not involve contact with a specific input device, and so on. Further, performance of the operations to detect and recognize the inputs to identify a particular gesture may be distributed throughout the system 300, such as by the computing device 202 and/or the web services 312 supported by the platform 310 of the cloud 308.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

In the discussion that follows, various sections describe various example embodiments. A section entitled "Example Data Structures" describes example data structures in accordance with one or more embodiments. Following this, a section entitled "Example Persistent Stream Table" describes a persistent stream table in accordance with one or more embodiments. Next, a section entitled "Example Persistent Following Table and Cache" describes an example persistent following table and cache in accordance with one or more embodiments. Following this, a section entitled "Example Persistent Notification Position Table and Cache" describes a persistent notification position table and cache in accordance with one or more embodiments. Next, a section entitled "Example in-Memory Stream Vector" describes a Stream vector in accordance with one or more embodiments. Following this, a section entitled "Example Substream Start Vector" describes a substream start vector in accordance with one or more embodiments. Next, a section entitled "Example in Memory State" describes state information in accordance with one or more embodiments. Last, a section entitled "Example Device" describes aspects of an example device that can be utilized to implement one or more embodiments.

Having described example operating environments in which the inventive embodiments can be utilized, consider now a discussion of example data structures and algorithms in accordance with one or more embodiments.

Example Data Structures

The various embodiments described below represent streams and substreams in memory with various data structures. The approaches utilize a fixed-size circular buffer which allows for streams or substreams to be changed or otherwise manipulated for each user in a fast and efficient manner.

The inventive approach takes advantage of the ordered aspects of streams to efficiently represent that information in memory. In one or more embodiments, a single quanta of memory maintains a large number of stream elements in memory in a data structure referred to as the "stream vector", and then chains those elements together into substreams.

Figure 3A:
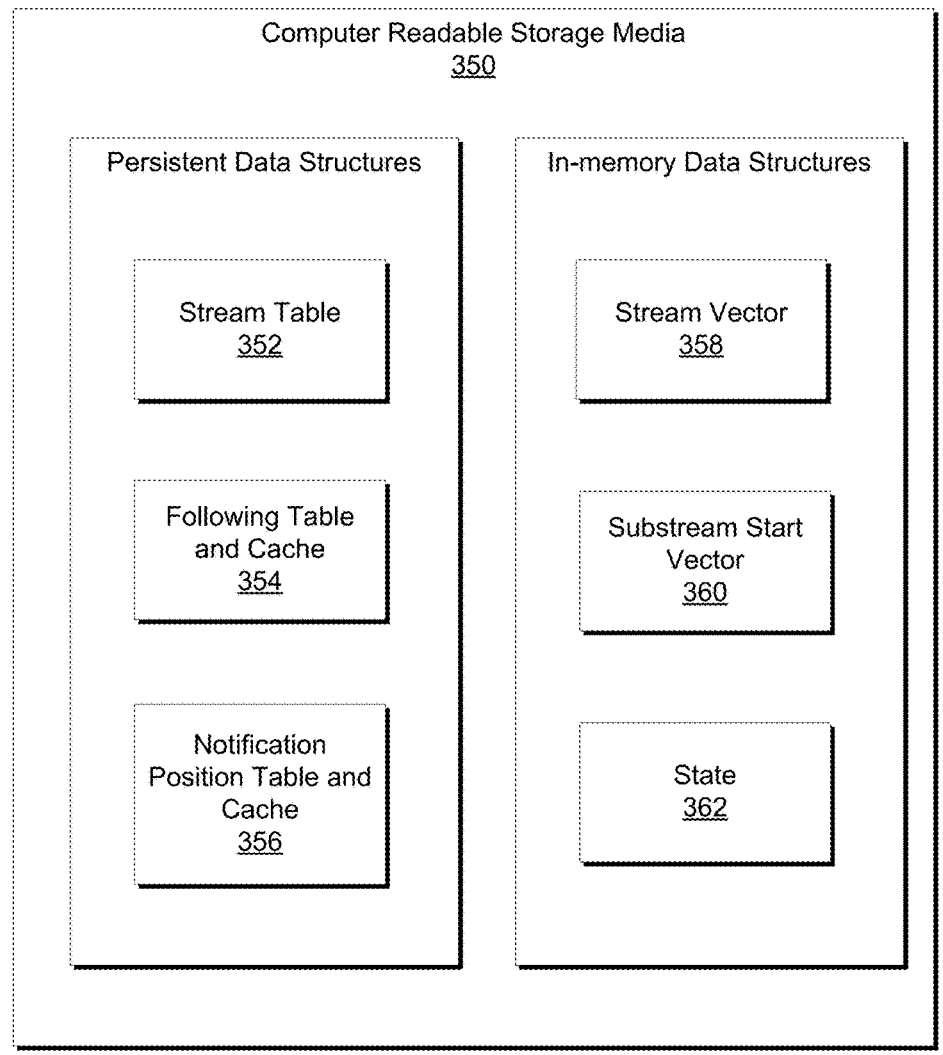
FIG. 3a illustrates example data structures in accordance with one or more embodiments.

With respect to the data structures, as shown in FIG. 3a, there are persistent data structures and in memory data structures that are stored on computer-readable storage media 350.

With respect to the persistent data structures, the inventive approach utilizes a persistent version of the same information that is utilized to initialize the stream vector. In one or more embodiments, the persistent data structures that are utilized by the inventive approach include, by way of example and not limitation: a persistent Stream Table 352, a persistent Following Table and Cache 354, and a persistent Notification Position table and Cache 356.

With respect to the in memory data structures, the inventive approach utilizes an in-memory Stream vector 358, an in-memory Substream Start vector 360, and an in-memory State 362 which tracks the state of the data structures. Each of these is described below in its own sub-section. These data structures are utilized in the various algorithms described below.

Example Persistent Stream Table

In one or more embodiments, the persistent stream table records the history of all posts that have been done globally. It is used to initialize the in memory data structure. Initialization starts with the most recent entry in the persistent stream table, reads the entries out of persistent storage and places them in the in-memory data structures and proceeds to older entries.

Accordingly, the persistent stream table tracks each update to a particular stream. The persistent stream table can utilize robust storage such as a database, although information is typically just appended to the end of the table. This information is maintained and available so that when a node, e.g. a server, starts up, it can initialize the in-memory data structures by scanning backwards, as noted above, through the records. As this table gets large, it can be trimmed from the beginning once an application no longer cares about the information contained in it. For example, in order to control costs, data that is unlikely to be used again can be purged. In the illustrated and described embodiment, the persistent stream table utilizes the following schema:

GlobalPosition: an auto-increment primary key that tracks the global order that items were added to the stream. In one embodiment, the GlobalPosition is 64 bits.

SubStreamID: identifies the substream that the item is being posted to. In a social networking application, this can be the ID of the User. In one embodiment, the SubStreamID is 32 bits.

ItemID: identifies the item being added to the stream. In a social networking application, this can be the ID of a post. In one embodiment, the ItemID is 27 bits.

Type: identifies the type of the item. There is a special type DELETED to indicate an element has been deleted. In one embodiment, the Type is 5 bits. The Type constitutes but one type of metadata that about an item that can be filtered on.

Example Persistent Following Table and Cache

In one or more embodiments, the persistent Following Table contains, for each UserID, the set of SubStreamIDs that are being followed. It constitutes a mapping of a particular UserID to the IDs of the people that the user is following. UserID and SubStreamID are the same IDs, but the naming is used to facilitate describing the relationship. In one or more embodiments, it utilizes the following schema:

UserID for a particular user. In one embodiment, the UserID is 32 bits.

Vector of SubStreamIDs that are being followed. In one or more embodiments, this is a vector of 32 bit values.

The Following Cache looks up rows in this table and keeps a certain number in memory.

Example Persistent Notification Position Table and Cache

The persistent Notification Table contains the GlobalPosition of the last element in the stream returned as a notification for a particular UserID. For example, when a user requests a notification, from a global position in the history of all the posts that have been made, there is particular point in which the user is interested. By recording this, when the user returns and requests additional notifications, anything with a global position less than the previous position of interest can be ignored.

It is persistent, in this case, so that the in-memory cache can be initialized. Updates to this table are random. In one or more embodiments, it has the following schema:

UserID: the user that the record is tracking. This is the same as a SubStreamID, but UserID is used to connect with the Following table. In one embodiment, the UserID is 32 bits.

GlobalPosition: the global position of the last element returned as a notification. In one embodiment, the GlobalPosition is 64 bits.

The Notification cache looks up values from the persistent storage and keeps a certain number in memory. Any suitable number of values can be maintained, given the memory resources available for storage.

Having considered example persistent data structures, consider now in-memory data structures in accordance with one or more embodiments.

Example in-Memory Stream Vector

The Stream Vector is a large contiguous block of cache-aligned memory that is used as a circular buffer to track stream Elements. In the illustrated and described embodiment, performance is enhanced by using cache-alignment, as will be appreciated by the skilled artisan. Each Element in the stream has the following values:

ItemID: identifies the item in the stream, for example to identify a particular post. In one embodiment, the ItemID is 27 bits.

Type: identifies the type of the ItemID. If the element is not being used, the type is set to DELETED. In one embodiment, 5 bits are used. The Type constitutes but one example of metadata that is associated with an item that can be used to query across.

SubStreamID: identifies the substream that this element is a part of. If there is no SubStreamID in an Element, it is set to the NO_SUBSTREAM value which is the maximum permissible value. In one embodiment, the SubStreamID is 32 bits.

Next: the index within the Stream Vector of the next older element in the substream, or the maximum expressible value NO_INDEX if there are no older elements in the substream. In one embodiment, Next is 32 bits.

Previous: the index within the Stream Vector of the previous newer element in the substream, or the maximum expressible value NO_INDEX if there are no newer elements in the substream. In one embodiment, Previous is 32 bits.

The Next and Previous values are utilized to effectively build a linked list that makes up a substream. In at least one embodiment, the value of the stream vector is designed to be as compact as possible since there will be many of them. In one embodiment, each element occupies 16 bytes, thereby enabling storage of 67 million records/GB of memory.

Example in-Memory Substream Start Vector

The SubstreamStart Vector can be used in the following way. Given a particular substream ID, one wants to ascertain the offset into the stream vector of the first element of the list that makes up the substream. For example, if one wishes to find a particular user's stream, the user ID for the set of users that you follow is acquired. Each of these is looked up in the substream start vector to find the start of the streams. Then, a merge is conducted across these stream starts and the most recent element in the stream vector is used. That user is advanced to the next element of her substream, and then the next one across all of the substreams being merged is taken and the process repeats.

In the present embodiment, the SubstreamStart Vector is a large contiguous block of memory that has an entry per possible SubStreamID. A SubStreamID is used as an index to lookup the index in the Stream Vector of the newest element in that substream or the maximum expressible value if there are no stream elements in memory for that substream. In one embodiment, this is 32 bits.

Example in-Memory State

In operation, a stream has a given state at any given point. In one or more embodiments, the State information includes:

Oldest: The index of the oldest element in the Stream vector. This is where new elements are inserted.

Full: A Boolean indicating that the Stream vector is full of elements.

Fill: One before the oldest element that has been inserted into the Stream vector during initialization.

GlobalPosition: If you view the stream as continuous, this is furthest point in the global sequence of values added. In one embodiment, this is 64 bits.

WriteLock: This is a lock used when adding items to the store. It does not stop readers from accessing the data structure at the same time.

Figure 4:
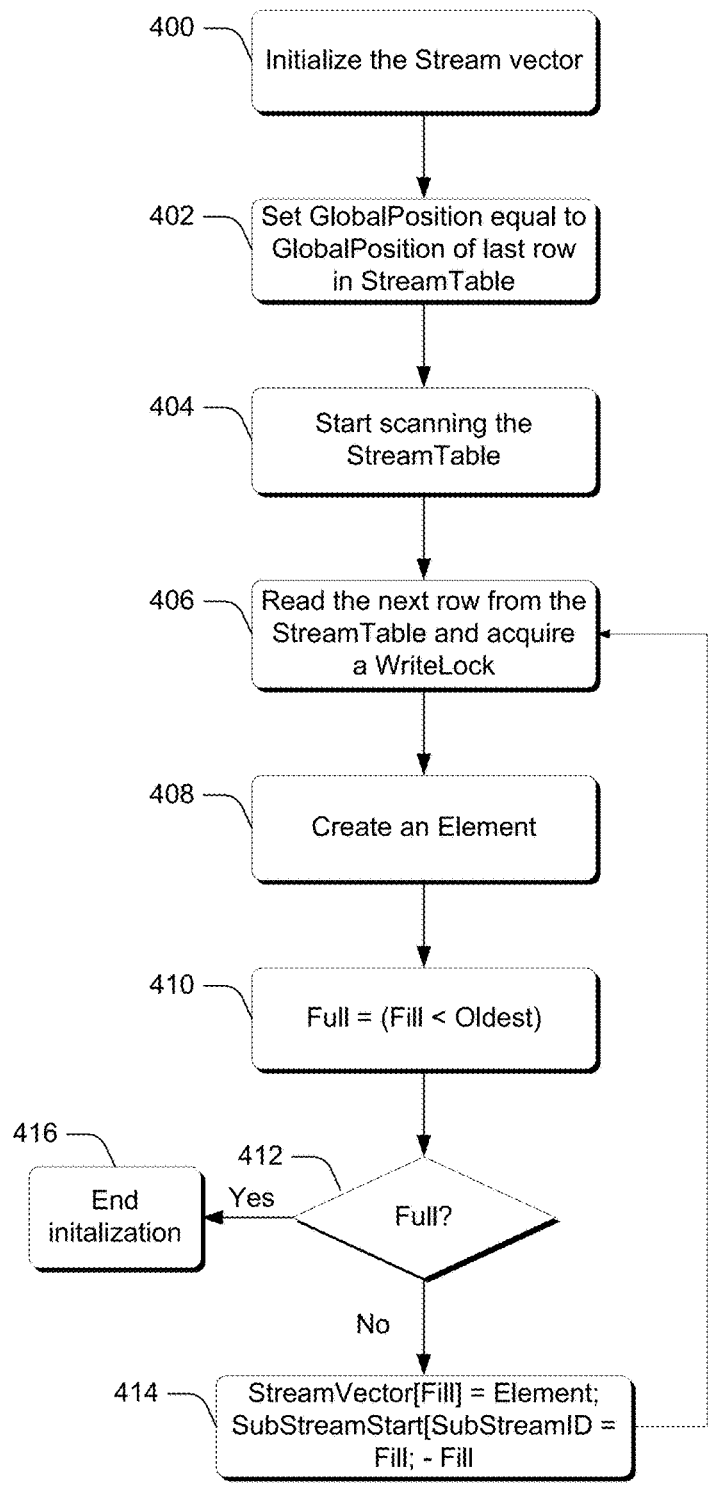
FIG. 4 is a flow diagram that describes steps in a method in accordance with one or more embodiments.
Figure 5:
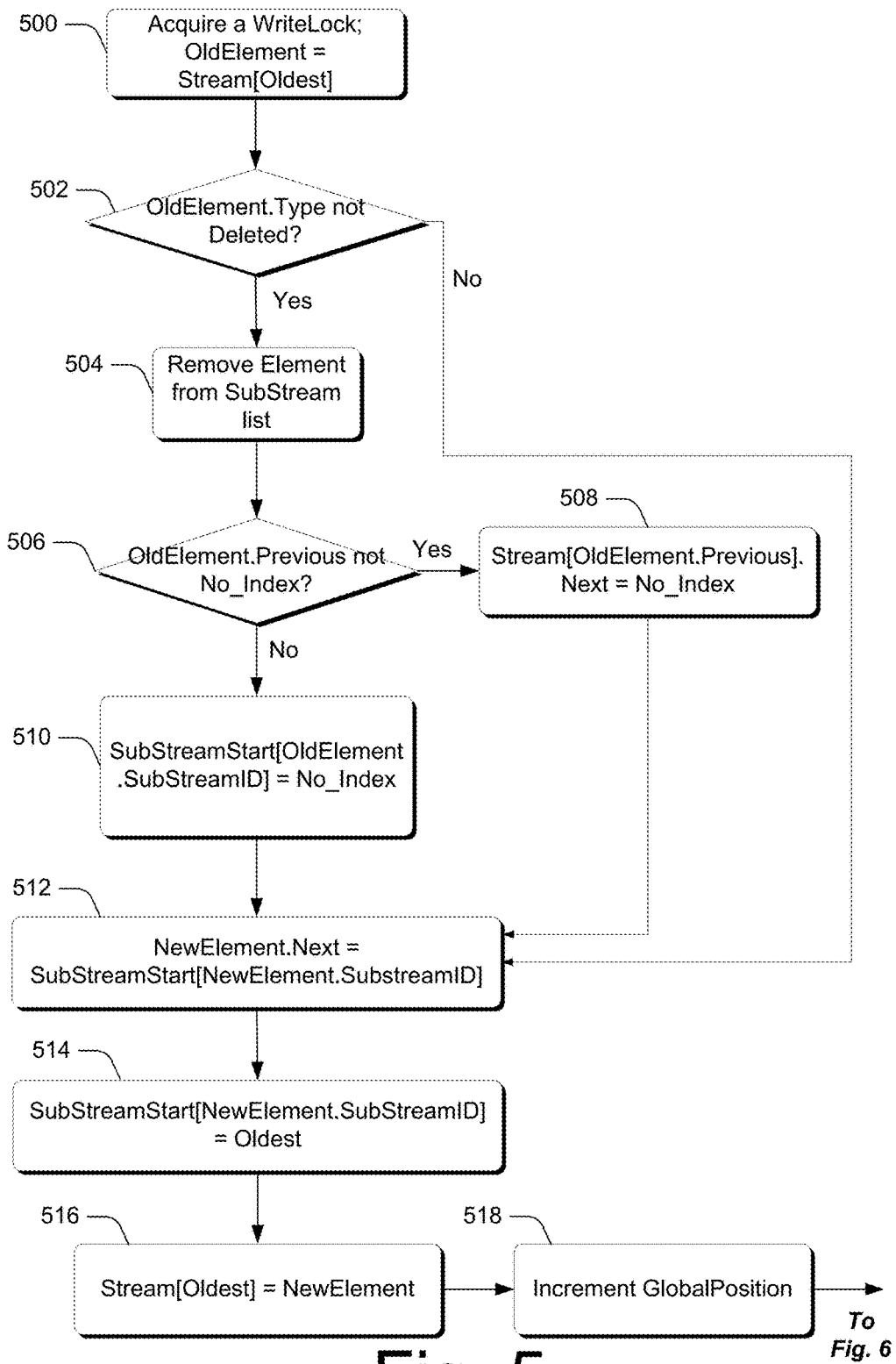
FIG. 5 is a flow diagram that describes steps in a method in accordance with one or more embodiments.

In one or more embodiments, the initialization process is designed to run in-parallel with returning results. The Stream Vector is initialized by a background process that is described in FIG. 4. The following description utilizes the definitions and descriptions set forth just above. The method can be performed by any suitable hardware, software, firmware, or combination thereof.

Step 400 initializes the Stream vector with elements that have a DELETED type. "Fill" should be the offset of the last element in the stream vector. This is so elements in the vector that have never been written to can be identified. Step 402 sets the GlobalPosition equal to the GlobalPosition of last row in the StreamTable and step 404 starts scanning the StreamTable from the most recent item backwards. Step 406 reads the next row from the StreamTable and acquires a WriteLock. Step 408 creates an Element. In the illustrated and described embodiment, the Element is defined as Element(ItemID, Type, SubStreamID, SubStreamStart[SubStreamID], NO_INDEX).

Step 410 sets Full=(Fill<Oldest). Step 412 ascertains whether the Full condition is met. If the Full condition is not met, step 414 sets StreamVector[Fill] equal to Element, SubStreamStart[SubStreamID] equal to Fill, decrements the Fill pointer by one and releases the WriteLock, and then returns to step 406. If, on the other hand, the Full condition is met, initialization is ended at step 416.

In one or more embodiments, a new element can be inserted in a stream using the following approach. Step 500 acquires a WriteLock and sets OldElement to Stream[Oldest]. This sets OldElement to the oldest element where a write is going to occur. Step 502 ascertains whether the OldElement type is not deleted. If the OldElement type is not deleted, step 504 removes the Element from the SubStream list. Step 506 ascertains whether the OldElement.previous does not have a No_Index value. If it does not have a No_Index value, step 508 sets Stream[OldElement.Previous].Next to No_Index to update the index. The method then proceed to step 512. If, on the other hand, OldElement.Previous has a No_Index value (the "no" branch from step 506), step 510 sets SubStreamStart[OldElement.SubStreamID] to No_Index and proceeds to step 512.

Returning to Step 502, if the OldElement.Type has been deleted, the method branches to step 512. Step 512 sets NewElement.Next to SubStreamStart[NewElement.SubstreamID]. Step 514 sets SubStreamStart[NewElement.SubStreamID] to Oldest and step 516 sets Stream[Oldest] to NewElement. Steps 512, 514 and 516 collectively insert the new element at the beginning of the substream list.

Figure 6:
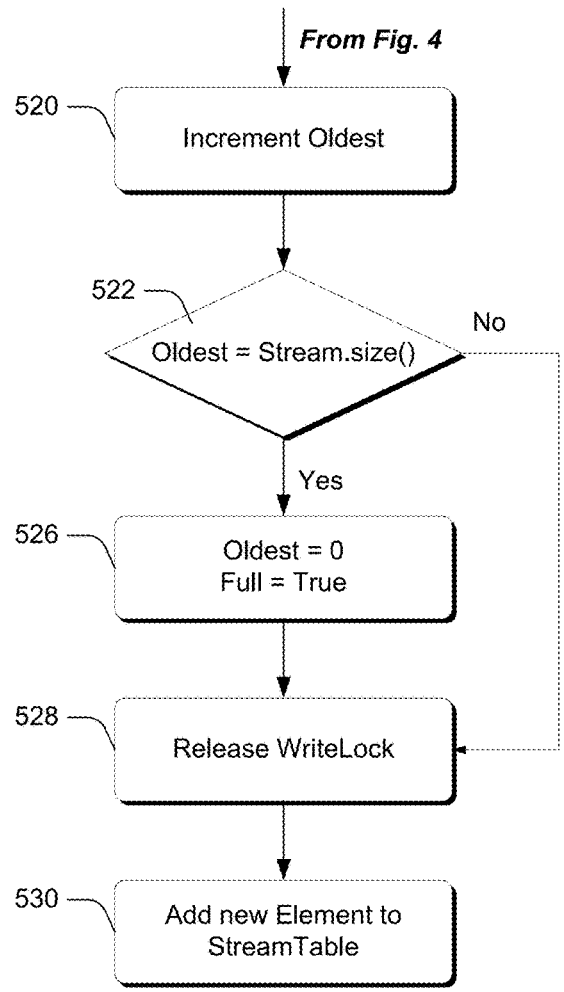
FIG. 6 is a flow diagram that describes steps in a method in accordance with one or more embodiments.

Step 518 increments the Global Position because the global position of the highest element on the table is one more than it used to be, and the method continues to FIG. 6.

Step 520 increments Oldest because now Oldest has now been filled and you do not want to write there again because Oldest is now the element after that.

Step 522 ascertains whether Oldest is equal to Stream.size( ). If not, the method branches to step 528 and releases the WriteLock. If, on the other hand, Oldest is equal to Stream.size( ), step 526 sets Oldest to 0 and Full to True which effectively wraps back around to 0. Step 528 releases the WriteLock and step 530 adds the new Element to the StreamTable so it is persistent.

The discussion now proceeds with a description of how iteration occurs over stream elements employing the notion of a memory barrier.

In multicore processing in a computer, there is a main memory and a cache. One processor could modify local cache memory, which modification has not been written out to main memory. Another processor may try to read that main memory and, as such, may obtain an incorrect result. A memory barrier is utilized to enforce an ordering constraint on memory operations issued before and after the barrier instruction.

In the illustrated and described embodiment, iteration can occur over Stream Elements to return the most recent elements of a particular type. In the code excerpt below, the MemoryBarrier( ) function ensures that writes to the so-called bookkeeping data are synchronized across threads. The access pattern is to get the value, then synchronize and check to see if the element is still valid after the MemoryBarrier( ). Using this approach allows reads to proceed even though writes are going on concurrently.

Figure 6A:
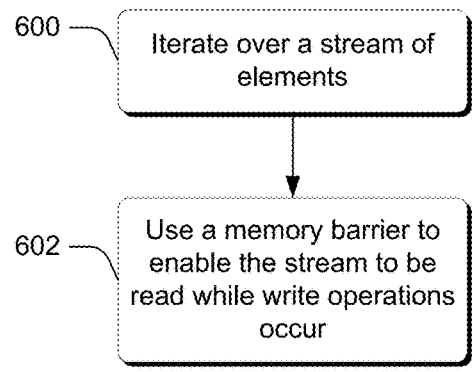
FIG. 6a is a flow diagram that describes steps in a method in accordance with one or more embodiments.

FIG. 6a is a flow diagram that describes steps in a method in accordance with one or more embodiments. The method can be implemented in connection with any suitable hardware, software, firmware, or combination thereof. In at least some embodiments, the method is implemented by software, such as stream processing module 314 (FIG. 3).

Step 600 iterates over a stream of elements pertaining to a stream of social networking data. Step 602 uses a memory barrier during iteration to enable the stream to be read while write operations are taking place. But one example of how this functionality can be implemented is described by the code excerpt immediately below.

The code below scans the stream vector from oldest going backwards through time to return elements that have a particular type in reverse time order.

```
Index = Oldest
Wrapped = false
KeepGoing = true
If Full
    // Stream is full of elements
// The reason for this is that one only needs to worry
about wrapping around if the vector is full.
    Do
    {
        If (Index = 0)
        {
```

```
            // Here we have wrapped around
                Wrapped = true
                Index = Stream.size( )
        }
        // Go to the next oldest element
            --Index
            Element = Stream[Index]
        // Ensure that the state is up to date
            MemoryBarrier( )
            If Wrapped && Index <= Oldest)
                // Hit items written
                    // We have gotten all the way around and back
    to oldest so there are no more elements
                KeepGoing = false
            Else if Element.Type == DesiredType
                // Found an element that can be returned. The
    yield means that if called again this will continue right
    after the yield.
                Yield Element
    } while (KeepGoing)
Else
    // Initialization may still be going on
    Limit = Fill
    Do
    {
        If (Index = 0)
            // Wrapped around to end
            Wrapped = true
            Index = Stream.size( )
        // Get the next oldest element
            --Index
            Element = Stream[Index]
            MemoryBarrier( )
                // If you are full, then stop when you have
    wrapped and gotten to the point where you hit the
    current oldest offset. If not full, then keep going until
    you hit the oldest element that has been inserted
    during initialization.
            If Full ? Wrapped && Index <= Oldest : Index > Fill
                // Wrapped around or hit Fill point
                KeepGoing = false
            Else if Element.Type == DesiredType
                // Return an element and keep going back in
    time
                Yield Element
    } while (KeepGoing)
```

In one or more embodiment, iteration can be utilized to find elements from particular substreams filtered by type and returned in order. In at least some embodiments, there are two different algorithms depending on how many substreams are being used. For both algorithms a vector of SubStreamID called SubStreams is passed in to identify the streams of interest. If there are many substreams, the global stream can be scanned using the previous algorithm and each element's SubStreamID can be checked to ascertain whether it is in SubStreams. In the more typical case, however, there are a small number of streams and heaps are utilized to pull out items in order, as will be appreciated by the skilled artisan. As background on heaps, a heap is essentially a specialized tree-based data structure that satisfies the heap property: If B is a child node of A, then key(A)≥key(B). This implies that an element with the greatest key is the root node, and so such a heap is sometimes called a max-heap. Alternatively, if the comparison is reversed, the smallest element is the root node which results in a min-heap.

In the illustrated and described embodiment, the following code excerpt describes but one way in which heaps can be utilized in this regard.

The code below creates a heap over the most recent item found in each substream. When an element is removed from a substream, the substream is reinserted in the heap with its next oldest element.

```
// Return the time order of a particular index in Stream. The newest
element has a time of −1, the element before that −2, etc.
// The reversal in sign is to match the heap implementation which is a
max-heap as described above
Time(Index, Oldest, WrappedOldest)
    Return Index − (Index < Oldest ? Oldest : WrappedOldest)
Heap = vector of Stream indices as big as SubStreams
Foreach(SubStreamID in SubStreams)
    Index = SubStreamStart[SubStream ID]
    If (Index != NO_INDEX)
       Heap.push_back(Index]
OriginalOldest = Oldest
WrappedOldest = OriginalOldest + Stream.size( )
// This is a lambda expression that compares two values and returns true if
index1 is older than index2.
Comparison = (Index1, Index2) -> bool {
    return Time(Index1, Oldest, WrappedOldest) < Time(Index2, Oldest,
WrappedOldest)
}
MakeHeap(Heap, Comparison)
KeepGoing = true
        // Heap.size( ) == 0 means the heap is empty and there are no more
results
While (KeepGoing && Heap.size( ) > 0)
{
    Index = Heap[0]
    Element = Stream[Index]
         // Remove the most recent element from the heap
   Heap.pop_heap( )
   MemoryBarrier( )
   CurrentOldest = Oldest
// Check to see if enough elements have been added that the heap is no
longer valid because the stream vector elements have been overwritten.
// If CurrentOldest > OriginalOldest then we check to see if the most recent
index is outside of the range of OriginalOldest to CurrentOldest which is
where elements that have not changed since we constructed the heap are
located.
// Otherwise, the valid offsets are between currentOldest and
OriginalOldest
// When we construct the heap we have this:
// xxxxxxxx <OriginalOldest> xxxxxxx
// As things are added it looks like this
// xxxxxxxx <OriginalOldest> yyyyy<CurrentOldest> xxxx
// Eventually due to wrap around, you have this
// yyyy<CurrentOldest> xxxx <OriginalOldest> yyyyyy
   If (CurrentOldest > OriginalOldest) ? Index < OriginalOldest || Index >=
CurrentOldest
                                : Index <OriginalOldest && Index >=
CurrentOldest)
    If (Element.Type == DesiredType)
       Yield Element
    NewIndex = Element. Next
    If NewIndex != NO_INDEX
    // Put the next oldest element back in heap
       Heap. push_back(NewIndex)
       Heap. push_heap(Comparison)
   Else
    // If top of heap is no longer valid, no later elements will be either
       KeepGoing = false
}
```

In one or more embodiments, an ability is provided to delete an entire substream. For example, in a social networking scenario, deleting a user would result in their substream being removed. In the illustrated and described embodiment, this can be accomplished as follows:

```
Acquire WriteLock
Index = SubStreamStart[SubStreamID]
Sub StreamStart[SubStreamID] = NO_INDEX
While (Index != NO_OFFSET)
{
   Stream[index].Type = DELETED
   Index = Stream[Index].Next
}
Release WriteLock
```

In at least some embodiment, the same data structures described above can also be used in a couple of different ways to support notifications over streams, substreams or combinations of substreams. In order to check for notifications, the appropriate elements are scanned as described in the previous algorithms, only with an additional check that compares the GlobalPosition of an element to the position stored in the NotificationPosition for a given UserID. Depending on the desired functionality, we can either scan the whole stream, the substream corresponding to the UserID or the stream made by merging the Following SubStreamID's for the UserID. The following code excerpt describes but one way in which this can be done.

```
Position(Index, OldestIndex, InitialPosition, WrappedPosition)
    Return Index + ((Index >= oldest) ? InitialPosition : WrappedPosition)
Grab WriteLock
OldestIndex = Oldest
InitialPosition = GlobalPosition - Oldest
WrappedPosition = GlobalPosition + Stream.size( ) - Oldest
Release WriteLock
<Previous stream algorithm with additional check that terminates when
Position(Index, OldestIndex, InitialPosition, WrappedPosition) is <=
Notification[SubStreamID]>
Index of first position is stored into the Notification Table
```

In one or more embodiments, the data structures can be used for multiple purposes in the same application, so each instance is given a unique stream name. This also allows for streams to be combined with other query criteria. By way of example, and not limitation, the streams can be used in search engine query expressions in the following ways:
  . . . ORDER BY . . . <Stream> DESC . . . . This sorts the result of the query in order that the query's ItemIDs are found in the Stream. If an ItemID is not found in the in-memory Stream vector, it is treated like a NULL value and sorted at the end. This corresponds to using the global stream algorithm
  . . . ORDER BY . . . FollowedStreams(UserID, <Stream>) . . . . This is the same as the previous one except that the Follows cache is used to identity a set of SubStreamIDs to follow and the segmented stream algorithm is used.
  WHERE . . . <Stream>.Position> <constant> . . . . This filter clause includes everything in the stream that is newer than the position and can be evaluated in the same way notifications are.
  WHERE . . . FollowedStream(UserID, <Stream>). Position> <constant> . . . . This filter clause includes everything in the stream created by merging all UserID followed streams that are newer than the given position. It can be evaluated in the same way notifications are.
  WHERE . . . <Stream>.Type=<constant type> . . . . This filter provides a type constraint for the global stream algorithm given above.
  WHERE . . . FollowedStream(UserID, <Stream>). Type=<constant type> . . . This filter provides a type constraint for the segmented stream algorithms given above.
  WHERE . . . <UserID property>=Follows(UserID, <stream>) . . . . This filter tests a given UserID property to see if is in the set of users that are followed by UserID in the stream.

Having described an example implementation, consider now a discussion of an example device that can be utilized to implement the embodiments described above.

[stop here]

Example Device

Figure 7:
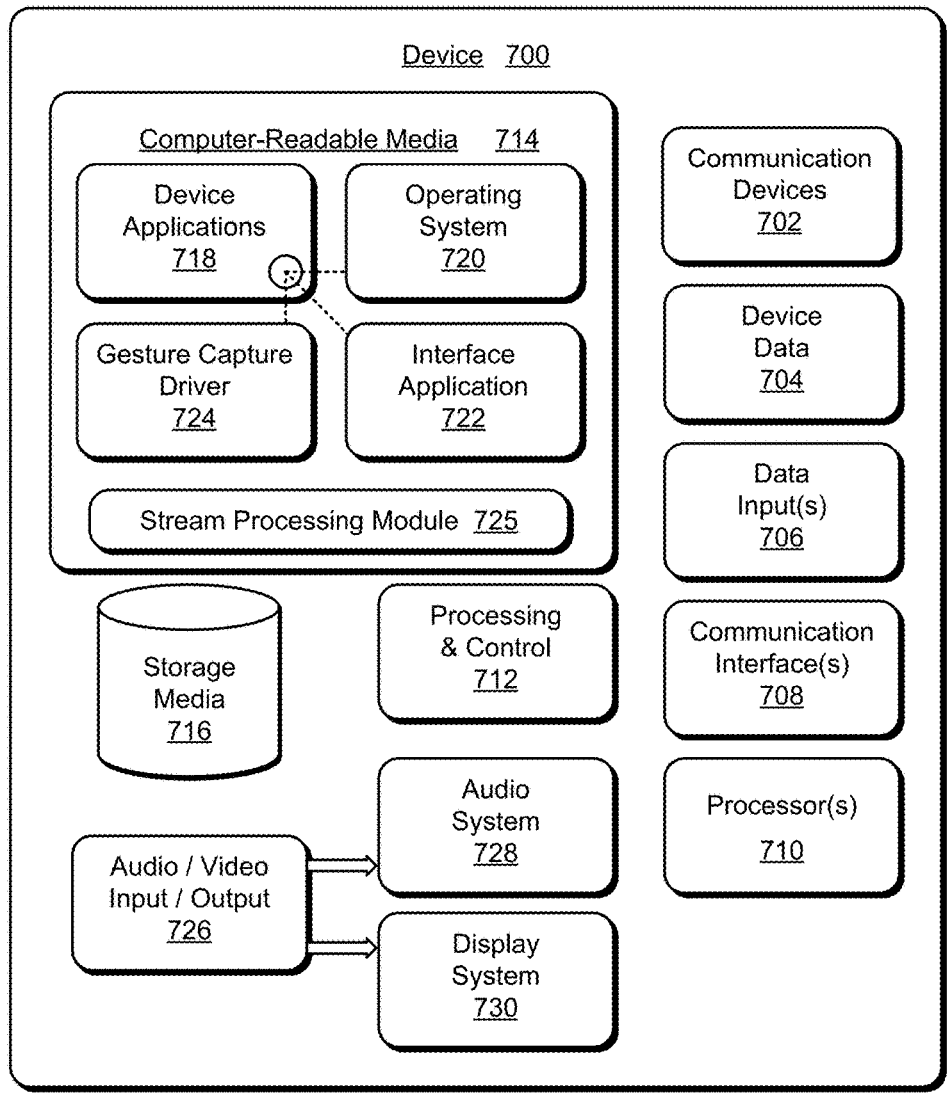
FIG. 7 illustrates an example computing device that can be utilized to implement various embodiments described herein.

FIG. 7 illustrates various components of an example device 700 that can be implemented as any type of portable and/or computer device as described with reference to FIGS. 1-3 to implement embodiments that can be operative within a social networking framework. Device 700 includes communication devices 702 that enable wired and/or wireless communication of device data 704 (e.g., received data, data that is being received, data scheduled for broadcast, data packets of the data, etc.). The device data 704 or other device content can include configuration settings of the device, media content stored on the device, and/or information associated with a user of the device. Media content stored on device 700 can include any type of audio, video, and/or image data. Device 700 includes one or more data inputs 706 via which any type of data, media content, and/or inputs can be received, such as user-selectable inputs, messages, music, television media content, recorded video content, and any other type of audio, video, and/or image data received from any content and/or data source.

Device 700 also includes communication interfaces 708 that can be implemented as any one or more of a serial and/or parallel interface, a wireless interface, any type of network interface, a modem, and as any other type of communication interface. The communication interfaces 708 provide a connection and/or communication links between device 700 and a communication network by which other electronic, computing, and communication devices communicate data with device 700.

Device 700 includes one or more processors 710 (e.g., any of microprocessors, controllers, and the like) which process various computer-executable or readable instructions to control the operation of device 700 and to implement the embodiments described above. Alternatively or in addition, device 700 can be implemented with any one or combination of hardware, firmware, or fixed logic circuitry that is implemented in connection with processing and control circuits which are generally identified at 712. Although not shown, device 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 700 also includes computer-readable media 714, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 700 can also include a mass storage media device 716.

Computer-readable media 714 provides data storage mechanisms to store the device data 704, as well as various device applications 718 and any other types of information and/or data related to operational aspects of device 700. For example, an operating system 720 can be maintained as a computer application with the computer-readable media 714 and executed on processors 710. The device applications 718 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 718 also include any system components or modules to implement embodiments of the techniques described herein. In this example, the device applications 718 include an interface application 722 and a gesture-capture driver 724 that are shown as software modules and/or computer applications. The gesture-capture driver 724 is representative of software that is used to provide an interface with a device configured to capture a gesture, such as a touchscreen, track pad, camera, and so on. Alternatively or in addition, the interface application 722 and the gesture-capture driver 724 can be implemented as hardware, software, firmware, or any combination thereof. In addition, computer readable media 714 can include a stream processing module 725 that functions as described above by implementing one or more of the algorithms.

Device 700 also includes an audio and/or video input-output system 726 that provides audio data to an audio system 728 and/or provides video data to a display system 730. The audio system 728 and/or the display system 730 can include any devices that process, display, and/or otherwise render audio, video, and image data. Video signals and audio signals can be communicated from device 700 to an audio device and/or to a display device via an RF (radio frequency) link, S-video link, composite video link, component video link, DVI (digital video interface), analog audio connection, or other similar communication link. In an embodiment, the audio system 728 and/or the display system 730 are implemented as external components to device 700. Alternatively, the audio system 728 and/or the display system 730 are implemented as integrated components of example device 700.

Conclusion

The various embodiments described above provide data structures and algorithms for efficiently computing a time ordered stream that is the combination of a time ordered substream for individual persons of interest. In addition, various embodiments provide an approach for identifying how many changes of interest have happened to a particular stream since it was last viewed.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. One or more computer readable storage devices embodying computer readable instructions to store data representing streams comprising sub-streams associated with social networking data that, responsive to execution by at least one processor, comprises:

recording a history of a plurality of posts in an associated social network in a stream table of a persistent data structure that tracks each update to at least one stream of social network data and utilizing the stream table to initialize one or more in-memory data structures;

providing a mapping from a user to people that the user follows in a following table and cache of the persistent data structure;

storing a global position of a last element in a stream returned as a notification for a particular User ID in a notification position table and cache of the persistent data structure;

tracking stream elements in a stream vector of an in-memory data structure and changing the stream elements to construct a sub-stream;

looking up an index in the stream vector of a newest element in the sub-stream in a sub-stream start vector of the in-memory data structure;

storing state information associated with the stream in the in-memory data structure;

scanning the stream table for the stream, a sub-stream corresponding to the particular User ID, or a stream made by merging sub-stream IDs of people being followed by the user; and creating a time ordered stream of social media updates that is a time ordered sub-stream of the particular User ID or a combination of time ordered sub-streams of people being followed by the user.

2. The one or more computer readable storage devices of claim 1, wherein the stream table comprises:

a global position that provides an auto-increment primary key that tracks global order of items that were added to a stream;

a Sub-Stream ID that identifies a sub stream that an item is posted to;

an Item ID that identifies an item being added to a stream; and metadata associated with individual items.

3. The one or more computer readable storage devices of claim 2, wherein the metadata comprises a type.

4. The one or more computer readable storage devices of claim 1, wherein the following table comprises:

a User ID that identifies a particular user; and a vector of Sub-Stream IDs that are being followed.

5. The one or more computer readable storage devices of claim 1, wherein the notification position table and cache comprises:

a User ID associated with a user that is being tracked; and a global position that represents a last element returned as a notification.

6. The one or more computer readable storage devices of claim 1, wherein the stream vector comprises a cache-aligned memory configured as a circular buffer.

7. The one or more computer readable storage devices of claim 1, wherein individual elements in the stream vector have values comprising:

an Item ID that identifies an item in a stream:

a type that identifies a type of an associated Item ID;

a Sub-Stream ID that identifies a sub stream of which a particular element is a part;

a next value that represents an index within the stream vector of the next older element in the sub-stream; and a previous value that represents an index within the stream vector of the previous newer element in the sub-stream.

8. The one or more computer readable storage devices of claim 1, wherein the state information comprises:
an oldest value that represents an index of an oldest element in the stream vector;
a full value that is configured to represent that a stream vector is full of elements;
a fill value that represents one element before an oldest element that has been inserted into the stream vector during initialization;
a global position value that represents a furthest point in a global sequence of values added; and
a write lock that represents a lock that is used when adding elements to a stream.

9. A data storage device storing persistent and in-memory data structures, comprising:
a memory storing the persistent data structures and the in-memory data structures, the data structures representing streams comprising sub-streams associated with social networking data, wherein the persistent data structures comprise:
a stream table recording a history of a plurality of posts in an associated social network to track each update to at least one stream of social network data, said stream table being utilized to initialize one or more in memory data structures;
a following table and cache providing a mapping from a user to people that the user follows; and
a notification position table and cache containing a global position of a last element in a stream returned as a notification for a particular User ID; and
the in-memory data structures comprise:
a stream vector tracking stream elements and changing the stream elements to construct a sub-stream;
a sub-stream start vector looking up an index in the stream vector of a newest element in the sub-stream; and
state information associated with the stream,
wherein the stream table for the stream, a sub-stream corresponding to the particular User ID, or a stream made by merging sub-stream IDs of people being followed by the user is scanned and a time ordered stream of social media updates is created that is a time ordered sub-stream of the particular User ID or a combination of time ordered sub-streams of people being followed by the user.

10. The data storage device of claim 9, wherein the stream table comprises:
a global position that provides an auto-increment primary key that tracks global order of items that were added to a stream;
a Sub-Stream ID that identifies a sub stream that an item is posted to;
an Item ID that identifies an item being added to a stream; and
metadata associated with individual items.

11. The data storage device of claim 10, wherein the metadata comprises a type.

12. The data storage device of claim 9, wherein the following comprises:
a User ID that identifies a particular user; and
a vector of Sub-Stream IDs that are being followed.

13. The data storage device of claim 9, wherein the notification position table and cache comprises:
a User ID associated with a user that is being tracked; and
a global position that represents a last element returned as a notification.

14. The data storage device of claim 9, wherein the stream vector comprises a cache-aligned memory configured as a circular buffer.

15. The data storage device of claim 9, wherein individual elements in the stream vector have values comprising:
an Item ID that identifies an item in a stream:
a type that identifies a type of an associated Item ID;
a Sub-Stream ID that identifies a sub stream of which a particular element is a part;
a next value that represents an index within the stream vector of the next older element in the sub-stream; and
a previous value that represents an index within the stream vector of the previous newer element in the sub-stream.

16. The data storage device of claim 9, wherein the state information comprises:
an oldest value that represents an index of an oldest element in the stream vector;
a full value that is configured to represent that a stream vector is full of elements;
a fill value that represents one element before an oldest element that has been inserted into the stream vector during initialization;
a global position value that represents a furthest point in a global sequence of values added; and
a write lock that represents a lock that is used when adding elements to a stream.

17. A computer-implemented method to store data representing streams comprising sub-streams associated with social networking data, comprising:
recording a history of a plurality of posts in an associated social network in a stream table of a persistent data structure that tracks each update to at least one stream of social network data and utilizing the stream table to initialize one or more in-memory data structures;
providing a mapping from a user to people that the user follows in a following table and cache of the persistent data structure;
storing a global position of a last element in a stream returned as a notification for a particular User ID in a notification position table and cache of the persistent data structure;
tracking stream elements in a stream vector of an in-memory data structure and changing the stream elements to construct a sub-stream;
looking up an index in the stream vector of a newest element in the sub-stream in a sub-stream start vector of the in-memory data structure;
storing state information associated with the stream in the in-memory data structure;
scanning the stream table for the stream, a sub-stream corresponding to the particular User ID, or a stream made by merging sub-stream IDs of people being followed by the user; and
creating a time ordered stream of social media updates that is a time ordered sub-stream of the particular User ID or a combination of time ordered sub-streams of people being followed by the user.

* * * * *